United States Patent
Pilgram

(10) Patent No.: US 8,720,819 B2
(45) Date of Patent: May 13, 2014

(54) PASSENGER SEAT, IN PARTICULAR AIRCRAFT PASSENGER SEAT

(75) Inventor: Christian Pilgram, Langenargen (DE)

(73) Assignee: RECARO Aircraft Seating GmbH & Co., KG., Schwäbisch Hall (DE)

( * ) Notice: Subject to any disclaimer, the term of this patent is extended or adjusted under 35 U.S.C. 154(b) by 2002 days.

(21) Appl. No.: 11/660,161

(22) PCT Filed: Jul. 7, 2005

(86) PCT No.: PCT/EP2005/007328
§ 371 (c)(1),
(2), (4) Date: Feb. 14, 2007

(87) PCT Pub. No.: WO2006/029666
PCT Pub. Date: Mar. 23, 2006

(65) Prior Publication Data
US 2008/0048067 A1      Feb. 28, 2008

(30) Foreign Application Priority Data
Sep. 14, 2004   (DE) .......................... 10 2004 044 235

(51) Int. Cl.
*B64C 13/00* (2006.01)
(52) U.S. Cl.
USPC .................................. 244/118.6; 297/452.56
(58) Field of Classification Search
USPC .......... 244/118.5, 118.6, 122 R; 297/452.56, 297/284.4, 284.2
See application file for complete search history.

(56) References Cited

U.S. PATENT DOCUMENTS

| | | | | |
|---|---|---|---|---|
| 2,860,691 A * | 11/1958 | Caesar | ......................... | 297/322 |
| 3,011,826 A * | 12/1961 | Elkins et al. | .................. | 297/383 |
| 4,869,554 A * | 9/1989 | Abu-Isa et al. | .......... | 297/452.56 |
| 5,112,109 A * | 5/1992 | Takada et al. | ................. | 297/343 |
| 5,816,654 A | 10/1998 | Ellis | | |
| 6,843,530 B1* | 1/2005 | Wu | ........................... | 297/284.4 |
| 2004/0130201 A1* | 7/2004 | Kawasaki et al. | ........ | 297/452.56 |

FOREIGN PATENT DOCUMENTS

| | | |
|---|---|---|
| DE | 42 32 679 | 2/1994 |
| EP | 0 301 938 | 2/1989 |
| EP | 0 639 479 | 2/1995 |
| FR | 2 556 197 | 6/1985 |

* cited by examiner

Primary Examiner — Philip John Bonzell
(74) Attorney, Agent, or Firm — Posz Law Group, PLC

(57) ABSTRACT

The invention relates to a passenger seat, in particular an aircraft passenger seat, comprising seating components such as a seat section (3) and a backrest (1), which is located on a backrest frame (7) and has at least one support section (15) that supports the relevant part of the body of the seat occupant, said section being displaceable in relation to the backrest frame (7) by means of an adjusting device (25). Said seat is characterized in that a web (15) constitutes the displaceable support section, said web extending between the lateral edges (5) of the backrest frame (7) and being suspended by its upper edge (17) from the backrest frame (7) and engaging at its lower end (23) that adjoins the seat section (3) with the adjusting device that is configured as a tensile device (25). The tensile device is used to exert a tensile force on the lower end of the web (15), in order to pull the web (15) forwards by said lower end (23) from a position in which it lies longitudinally against the backrest (1).

10 Claims, 2 Drawing Sheets

PASSENGER SEAT, IN PARTICULAR AIRCRAFT PASSENGER SEAT

Figure 1:
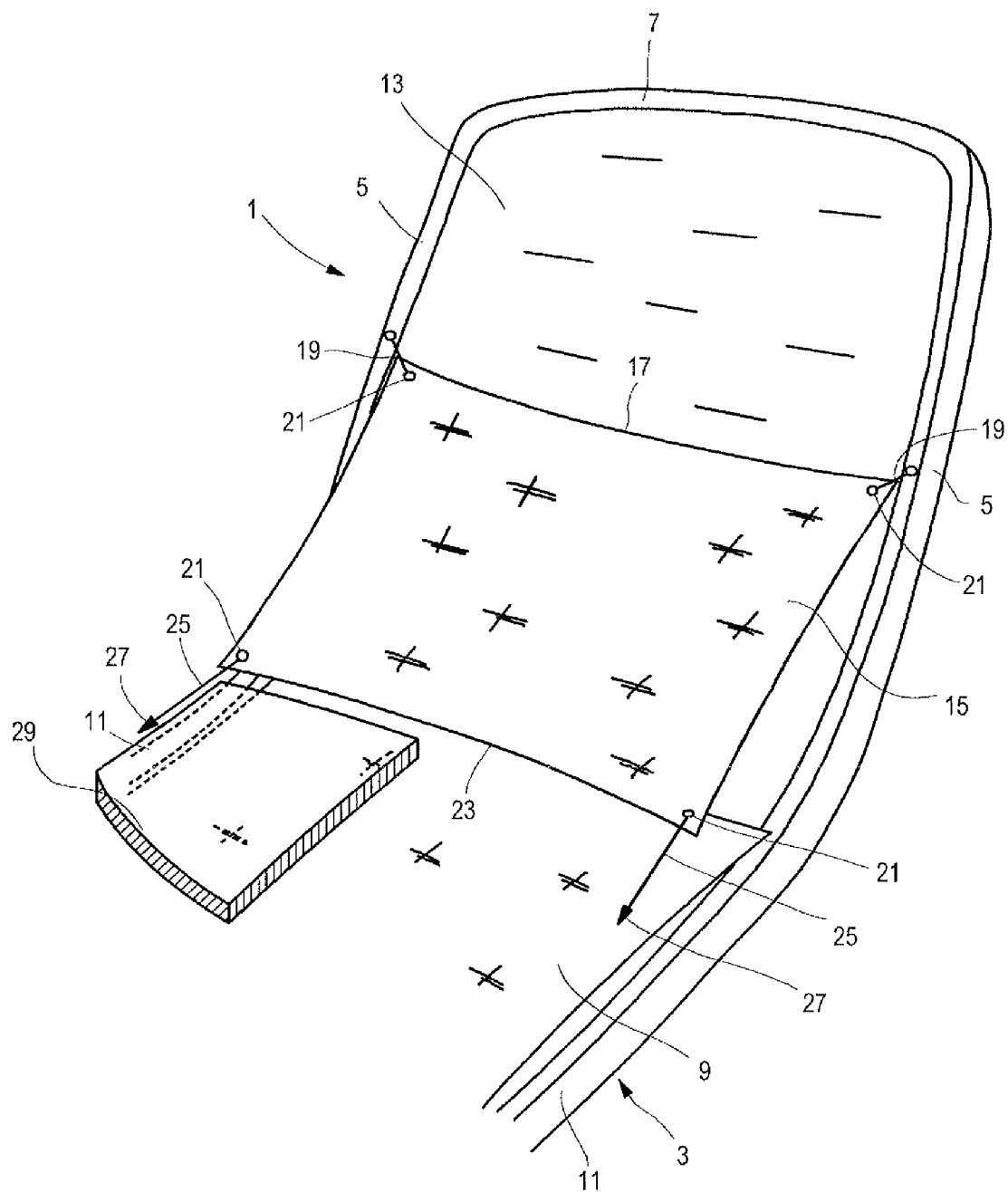

The invention relates to a passenger seat, in particular an aircraft passenger seat, having seat components such as the seat part and the backrest which is located on the backrest frame and which has at least one support part which is used to support the pertinent body part of the seat occupant and which can be moved by means of an adjustment means relative to the backrest frame.

A seat of this type is already known from EP 0 639 479 B1. Seats of this type generally offer the possibility of selective adjustment of the position of at least some seat components so that the passenger or seat occupant can adapt the pertinent components to his needs. If these seats are used for seating on passenger aircraft, special requirements must be imposed especially on the function of the backrest, more accurately on the adjustability of the support elements of the backrest. Thus, with respect to seating comfort and especially for safety reasons it is especially important, for the tilt angle at which the backrest supports the back of the seat occupant to be adjustable. In order to satisfy air travel safety regulations, the backrest must make available, at least during the operating phases of take-off, landing, and taxiing, a tilt angle which corresponds to the upright sitting position of the seat occupant. On the other hand, for reasons of comfort it must be possible to reduce the tilt angle of the backrest such that the seat occupant can assume a reclined resting position which can be used as a sleeping position, which is especially important on long-distance flights.

Conventionally, in order to meet these requirements, in such known seats a mechanical adjustment mechanism which can be controlled by the seat occupant is present, by means of which the tilt angle of the pertinent support parts of the backrest relative to the backrest frame or the tilt of the backrest frame itself can be adjusted. The positioning means provided for this purpose leads to an increase in weight, since heavy mechanical components such as gas springs are necessary. In conjunction with the required, pertinent control elements, the seat system becomes complex and production costs become high.

With respect to this prior art, the object of the invention is to make available a passenger seat, especially an aircraft passenger seat, which offers the possibility of adjusting the effective tilt of the backrest, but regardless of which is characterized by especially simple, economical and lightweight construction.

This object is achieved by a passenger seat with the features of claim 1 in its entirety.

As indicated in the characterizing part of claim 1, as claimed in the invention there is a web suspended on its upper end on the backrest frame as a movable support part, a tension means which forms the adjustment means acting on its lower end such that the lower end of the web can be pulled forward out of a position which hangs down along the backrest on its lower end. The web can be tensioned in this way such that a support surface with the correspondingly altered tilt angle arises for the back of the seat occupant.

The web can be suspended on the backrest frame such that it forms a support surface in the region of the lower half of the backrest. By pulling the front end of the web forward by individually desired pulling segments, the lower back region of the seat occupant can be optimally supported up to lordosis. For this reason long-distance flights then become especially pleasant for the seat occupant who can assume a reclined sleeping position.

One special advantage of the seat as claimed in the invention consists in that the effective backrest angle (tilt backwards) can be increased without this adjustment measure's adversely affecting the living space of the seat occupant next behind.

The web which forms the movable support part can also be formed by a respective tension-resistant net. Preferably it is a fine-mesh net formed from strands with high tensile strength.

In advantageous embodiments there is a web which extends essentially over the entire width of the backrest from side rail to side rail.

The web can be directly suspended on the two corner regions of its upper end on each associated side rail of the backrest frame.

Preferably the web, relative to the main longitudinal axis of the backrest, is suspended with its upper end in the middle longitudinal region of the backrest, the length of the web referenced to the main longitudinal axis of the backrest being selected such that it extends at least to the region of the seat surface of the seat part with its front end in the hanging-down position. The effective tilt of the backrest is thus adjusted by changing the backrest configuration in the lower back area of the seat occupant, so that he can assume not only an especially flat seat position, but also improved support of the pelvic region of the seat occupant is achieved so that sleeping while sitting is facilitated.

The construction is especially simple when the tension means which is used as an adjustment means and which acts on the bottom end of the web has tension elements which each act on the side corner regions of the lower end of the web on the latter.

When the tension means is made such that on the tension elements acting laterally on the web, alternatively tension forces of varied strength can be produced, the web can be adjustable as required only on one side or can be pulled forward to different degrees on its sides. In this way, for the seat occupant a lateral sleeping position with simultaneous pelvic support is possible.

Preferably the web is configured on the backrest such that at least with its surface region located above the lower end region it extends underneath the cushion or cover element which can be concomitantly moved forward by the adjustment movement of the web in the region which covers the web.

The invention will be detailed below using embodiments shown in the drawings.

Figure 2:
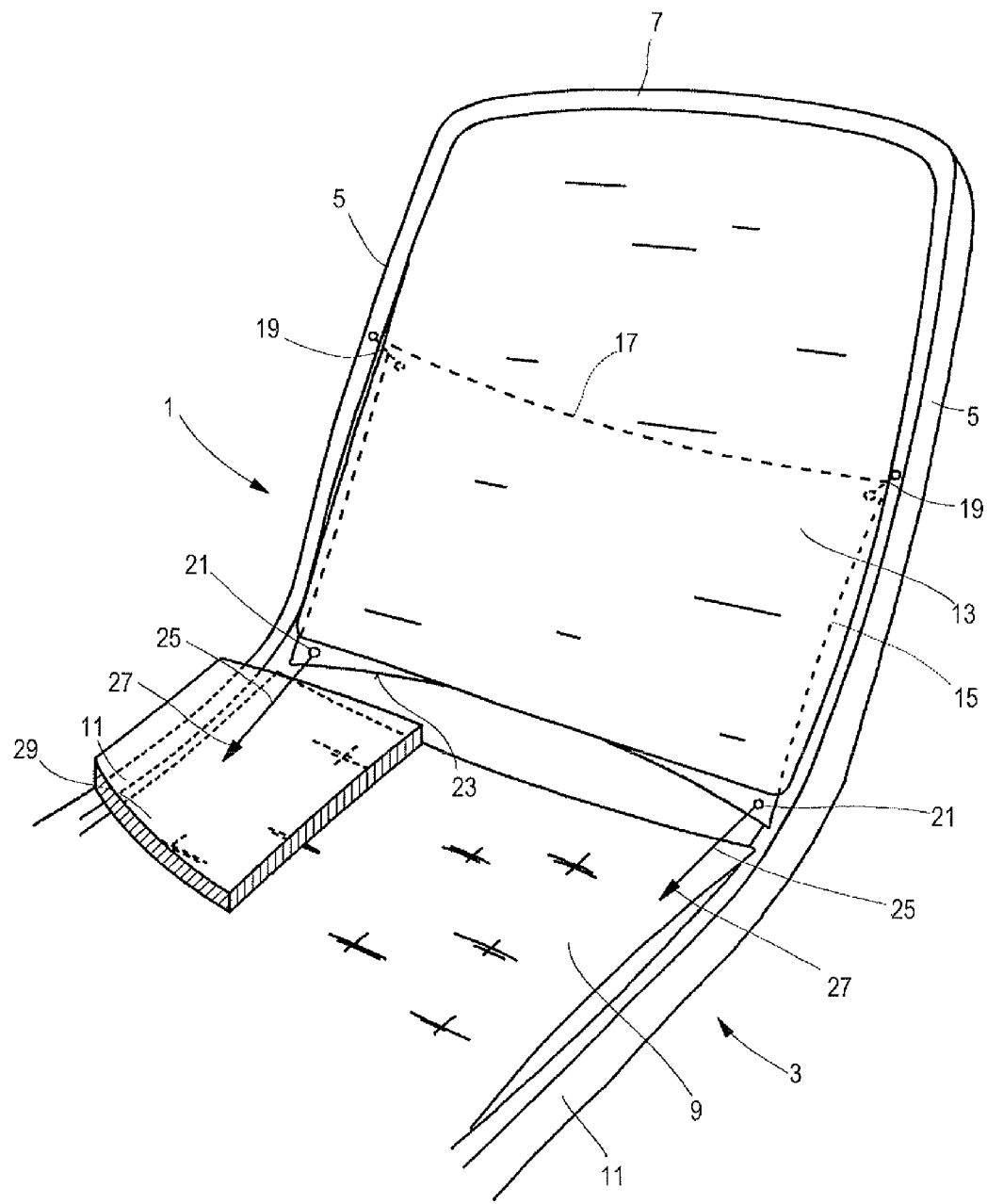

FIG. 1 shows a highly schematically simplified and perspective oblique view of only the backrest and part of the seat part of one embodiment of the seat as claimed in the invention bordering it, in the form an aircraft passenger seat, and FIG. 2 shows a representation of a second embodiment corresponding to FIG. 1.

In the figures the invention is explained using an aircraft passenger seat in which the backrest is designated as a whole as 1 and the seat part is designated as a whole as 3. The backrest has a backrest frame 7 with side rails 5. On the seat part 3 the seat surface is designated as 9. The seat surface is formed by a suitable component, for example a plastic molding part, which forms the support surface for a seat cushion 29. In the manner conventional for these seats, the component which forms the seat surface 9 along its side seat cross-pieces 11 which form the continuations of the side rails 5 of the backrest 1 can be adjusted in position in the longitudinal direction of the seat.

On the backrest 1, between the side rails 5, there is a backrest cushion 13 as the main support part for the back of the seat occupant. In addition, for this purpose the support part which can be moved relative to the backrest frame 7 is a web suspended on the backrest frame 7 in the form of a net 15. It is preferably a fine-mesh net with a mesh width which affords a certain moisture permeability, as is desirable for seat materials. The net 15 is made of tension-resistant strands so that a web of high tensile strength is formed. Fire-resistant, nonstretching materials can be used as the strand material.

As is readily apparent from FIG. 1, the net 15 on its upper end 17 in the two side corner regions on the side rails 5 of the backrest 7 is suspended in its middle longitudinal region, the tabs 19 being used as suspension engaging the reinforcing eyes 21 incorporated into the net 15. As FIG. 1 shows, the net 15 which forms the movable web suspended on the backrest frame 7 extends essentially over the entire width of the backrest from the side rail 5 to the side rail 5, the length of the net 15 referenced to the main longitudinal axis of the backrest 1 being dimensioned such that the lower end 23 extends to the seat surface 9 of the seat part 3.

Analogously to the upper end 17 of the net 15, in the two lateral corner regions on the lower end 23 reinforcing eyes 21 are likewise incorporated which are engaged by tension elements which can be for example tension cables 25. The tension cables 25 are guided along the side seat cross-pieces 11 forward to each tension means associated with each tension cable 25, which means are part of an adjustment means which is not shown in the drawings, because it can be different according to the respective circumstances. The adjustment means must simply be made such that the tension means association with the tension cables 25 produce on the tension cables 25 tension forces of selectable strength which are active to the front according to the arrow 27 drawn on the tension cables 25.

FIG. 1 shows a backrest adjustment position in which the web formed by the net 15 is pulled forward on its lower end 23 beyond the seat surface 9 by tension forces of the same strength acting in the two tension cables 25, so that the backrest 1 causes a reclined seat position according to this position of the net 15 for the seat occupant.

In the slightly modified embodiment shown in FIG. 2, the net 15 which is made in the same manner as in FIG. 1 and is suspended on the side rails 5 of the backrest frame 7, in contrast to FIG. 1, is shown in the adjustment position corresponding to the upright position in which it hangs down along the backrest 1 because there is no tension force in the tension cables 25 which are connected in the same way as in FIG. 1 to the tension means. In a further difference from FIG. 1, the movable web formed by the net 15 is not located above the main backrest cushion 13, but is overlapped by it. The cushion 13 can be moved at the same time in the region which overlaps the net 15 in the adjustment motion of the net 15, so that the lower region of this cushion 13 can be pulled forward with the net 15 when a corresponding tension force is produced in the tension cables 25 in order to vary the backrest tilt so that the adjustment position shown in FIG. 1 can also be achieved as in the example from FIG. 2.

As indicated in the foregoing, tension forces of different strength can be produced in the tension cables 25 so that the support surface formed by the net 15 or the region of the cushion 13 covering the net 15 can be tilted differently on the two sides. As a result a lateral sleeping position with simultaneous pelvic support of the seat occupant can be achieved.

When, as already indicated, the component forming the seat surface 9 in the manner conventional for these seats can be moved along the side rails 11 in the longitudinal direction of the seat for adjusting the position, the configuration is preferably such that the adjustment motion of the net 15, for which the region of the lower end 23 of the net 15 is pulled forward, can be combined with a corresponding adjustment motion of the seat surface 9 forward. When manual displacement of the position of the component forming the seat surface 9 or a positioning drive is provided for this surface, the adjustment motion of the component forming the seat surface 9 can be transferred via the tension cables 25 directly to the net 15. Alternatively, by means of the tension means associated with the tension cables 25 there can be individual position adjustment of the net 15 coupled to the adjustment motion of the seat surface 9, so that the net 15 can be pulled forward as desired on one side or both sides by distances which differ relative to the longitudinal displacement of the component which forms the seat surface 9.

The invention claimed is:

1. A passenger seat, in particular an aircraft passenger seat, comprising:
   a seat part with a seat surface and a seat cushion, wherein the seat surface provides support for the seat cushion;
   a backrest, which is located on a backrest frame, wherein the backrest frame has a side rail member at each side of the backrest frame, the backrest is arranged between the side rail members, and the backrest has a backrest cushion, which is provided as a main support part for a back of a seat occupant;
   at least one support part, which is separate from the backrest cushion and the seat cushion and which provides support for a pertinent body part of the seat occupant, wherein
   the support part can be moved by tension elements relative to the backrest frame,
   the support part is a web that extends between the side rail members of the backrest frame, and the web is suspended at its upper end on the backrest frame,
   a lower end of the web, which is adjacent to the seat part, is engaged by the tension elements,
   a tensile force can be applied by the tension elements to the lower end of the web to pull the web forward, in a longitudinal direction of the seat surface, out of a position in which the web hangs down along the backrest and to adjust a tilt angle of the support part.

2. The seat as claimed in claim 1, wherein the web extends essentially over the entire width of the backrest from side rail member to side rail member.

3. The seat as claimed in claim 1, wherein the web extends in a surface region located above its lower end and underneath the backrest cushion, which can be moved in a region that covers the web by adjustment motion of the web.

4. The seat as claimed in claim 1, wherein the web is formed by a net.

5. The seat as claimed in claim 4, wherein the net, which forms the web, is a fine-mesh net formed from strands with high tensile strength.

6. The seat as claimed in claim 1, wherein the web, relative to a main longitudinal axis of the backrest, is suspended with its upper end in a longitudinally middle region of the backrest, and the web extends at least to a region of the seat surface of the seat part with a front end of the web in a hanging-down position.

7. The seat as claimed in claim 6, wherein the web is suspended at two corner regions of its upper end on the side rail members, respectively, of the backrest frame.

8. The seat as claimed in claim 1, wherein the tension elements, which engage the lower end of the web, engage side corner regions of the lower end of the web, respectively.

9. The seat as claimed in claim 8, wherein the tension elements engage reinforcing eyes incorporated into the web.

10. The seat as claimed in claim 8, wherein the tension elements provide tension forces of different strength to the side corner regions of the lower end of the web.

\* \* \* \* \*